(12) United States Patent
Sullivan et al.

(10) Patent No.: US 9,636,546 B2
(45) Date of Patent: May 2, 2017

(54) MULTI-LAYERED CORES FOR GOLF BALLS BASED ON IONOMERS

(71) Applicant: Acushnet Company, Fairhaven, MA (US)

(72) Inventors: Michael J. Sullivan, Old Lyme, CT (US); Mark L. Binette, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/852,857

(22) Filed: Sep. 14, 2015

(65) Prior Publication Data

US 2016/0001135 A1 Jan. 7, 2016

Related U.S. Application Data

(62) Division of application No. 13/152,577, filed on Jun. 3, 2011, now Pat. No. 9,132,319.

(51) Int. Cl.
*C08L 23/04* (2006.01)
*A63B 37/02* (2006.01)
(Continued)

(52) U.S. Cl.
CPC ...... *A63B 37/0075* (2013.01); *A63B 37/0003* (2013.01); *A63B 37/0039* (2013.01); *A63B 37/0044* (2013.01); *A63B 37/0049* (2013.01); *A63B 37/0059* (2013.01); *A63B 37/0063* (2013.01); *A63B 37/0069* (2013.01); *A63B 37/0076* (2013.01); *A63B 37/0092* (2013.01); *A63B 37/02* (2013.01); *A63B 37/06* (2013.01);
(Continued)

(58) Field of Classification Search
CPC .... C08L 23/0876; C08L 23/025; C08L 23/04; A63B 37/0051; A63B 37/0059; A63B 37/0063; A63B 37/02
See application file for complete search history.

(56) References Cited

U.S. PATENT DOCUMENTS 5,184,828 A * 2/1993 Kim ................... A63B 37/0003
473/373
5,691,418 A 11/1997 Hagman et al.
(Continued)

OTHER PUBLICATIONS

DuPont, Technical Data Sheet-Golf Ball Resins, HPF 2000, May 2005.
(Continued)

*Primary Examiner* — John E Simms, Jr.
(74) *Attorney, Agent, or Firm* — Daniel W. Sullivan

(57) ABSTRACT

Multi-piece golf balls having a solid core of at least one layer and cover of at least one layer are provided. Thermoplastic ethylene acid copolymer ionomer compositions are used to form the core layers. Preferably, the ball contains a dual-core having an inner core and surrounding outer core layer. Low modulus and high modulus ionomer compositions may be used in the core structure. In one embodiment, a first ionomer composition is used to form the inner core and a second ionomer composition is used to form the outer core, and the flex modulus of the first composition is greater than the flex modulus of the second composition. The ionomer compositions have varying levels of hardness. The resulting ball has high resiliency and rebounding properties.

14 Claims, 2 Drawing Sheets

(51) Int. Cl.
*A63B 37/00* (2006.01)
*C08L 23/08* (2006.01)
*A63B 37/06* (2006.01)
*A63B 37/12* (2006.01)
*C08L 23/02* (2006.01)

(52) U.S. Cl.
CPC .............. *A63B 37/12* (2013.01); *C08L 23/04* (2013.01); *C08L 23/08* (2013.01); *C08L 23/0876* (2013.01); *A63B 37/0033* (2013.01); *A63B 37/0037* (2013.01); *A63B 37/0064* (2013.01); *C08L 23/025* (2013.01)

(56) References Cited

U.S. PATENT DOCUMENTS

| | | | |
|---|---|---|---|
| 6,057,403 | A | 5/2000 | Sullivan et al. |
| 6,756,436 | B2 | 6/2004 | Rajagopalan et al. |
| 6,815,480 | B2 | 11/2004 | Statz et al. |
| 6,824,477 | B2 | 11/2004 | Rajagopalan et al. |
| 6,981,926 | B2 | 1/2006 | Sullivan et al. |
| 6,988,962 | B2 | 1/2006 | Sullivan et al. |
| 7,140,981 | B2 | 11/2006 | Sullivan et al. |
| 7,147,578 | B2 | 12/2006 | Nesbitt et al. |
| 7,207,903 | B2 | 4/2007 | Sullivan et al. |
| 7,211,008 | B2 | 5/2007 | Sullivan et al. |
| 7,312,267 | B2 | 12/2007 | Kennedy et al. |
| 7,357,736 | B2 | 4/2008 | Sullivan et al. |
| 7,375,151 | B2 | 5/2008 | Statz et al. |
| 7,452,290 | B2 | 11/2008 | Sullivan et al. |
| 7,468,006 | B2 | 12/2008 | Sullivan et al. |
| 7,513,838 | B2 | 4/2009 | Sullivan et al. |
| 7,517,289 | B2 | 4/2009 | Sullivan et al. |
| 7,530,907 | B2 | 5/2009 | Sullivan et al. |
| 7,607,995 | B2 | 10/2009 | Sullivan et al. |
| 7,654,916 | B2 * | 2/2010 | Sullivan ............ A63B 37/0003 473/376 |
| 7,654,917 | B2 | 2/2010 | Sullivan et al. |
| 7,731,606 | B2 | 6/2010 | Sullivan et al. |
| 7,731,607 | B2 | 6/2010 | Sullivan et al. |
| 7,744,488 | B2 | 6/2010 | Sullivan et al. |
| 7,766,767 | B2 | 8/2010 | Sullivan et al. |
| 7,766,768 | B2 | 8/2010 | Sullivan et al. |
| 7,833,112 | B2 | 11/2010 | Sullivan et al. |
| 7,867,106 | B2 | 1/2011 | Sullivan et al. |
| 7,871,342 | B2 | 1/2011 | Dalton et al. |
| 7,901,300 | B2 * | 3/2011 | Iwami ............... A63B 37/0003 473/373 |
| 7,935,004 | B2 * | 5/2011 | Dalton ............... A63B 37/0003 473/373 |
| 2002/0155906 | A1 | 10/2002 | Sullivan et al. |
| 2006/0172823 | A1 * | 8/2006 | Loper ............... A63B 37/0003 473/371 |
| 2007/0203277 | A1 * | 8/2007 | Chen ................. A63B 37/0003 524/322 |
| 2008/0220905 | A1 * | 9/2008 | Sullivan ............ A63B 37/0003 473/376 |
| 2009/0017940 | A1 | 1/2009 | Sullivan et al. |
| 2009/0118040 | A1 | 5/2009 | De Garavilla |
| 2009/0124413 | A1 * | 5/2009 | Sullivan ............ A63B 37/0059 473/373 |
| 2009/0227394 | A1 | 9/2009 | Bulpett et al. |
| 2010/0304893 | A1 | 12/2010 | De Garavilla |
| 2011/0105248 | A1 * | 5/2011 | Shigemitsu ........ A63B 37/0003 473/385 |
| 2011/0143863 | A1 * | 6/2011 | Sullivan ............ A63B 37/0043 473/376 |

OTHER PUBLICATIONS

DuPont, Technical Data Sheet-Golf Ball Resins, HPF 1000, May 2005.

\* cited by examiner

MULTI-LAYERED CORES FOR GOLF BALLS BASED ON IONOMERS

CROSS-REFERENCE TO RELATED APPLICATIONS

This application is a divisional of co-assigned U.S. patent application Ser. No. 13/152,577 having a filing date of Jun. 3, 2011, now allowed, the entire disclosure of which is hereby incorporated by reference.

BACKGROUND OF THE INVENTION

Field of the Invention

The present invention generally relates to multi-piece golf balls having a solid core of at least one layer and cover of at least one layer. A thermoplastic ionomer composition is used to form at least one of the core layers. Preferably, the ball contains a dual-core having an inner core and surrounding outer core layer or a multi-layered core having an inner core, intermediate core layer, and outer core layer. Low modulus and high modulus ionomer compositions may be used in the core structure. The resulting ball has high resiliency and rebounding properties.

Brief Review of the Related Art

Golf ball manufacturers are continuously looking to improve the properties and playing performance of golf balls. One way for improving the quality of golf balls is by designing and developing new ball materials and structures. Multi-piece, solid golf balls having a solid inner core protected by a cover are used today. Normally, the inner core is made of a natural or synthetic rubber material such as, for example, styrene butadiene, polybutadiene, poly(cis-isoprene), or poly(trans-isoprene); and the outer cover is made of a durable material such as, for example, ethylene acid copolymer ionomer resins, polyamides, polyesters, polyurethanes, or polyureas. The core and cover may be single or multi-layered. Intermediate (casing) layers may be disposed between the core and cover layers to form four-piece and five-piece balls and the like. Today, the industry is interested, among other things, in making balls that can rebound faster, retain more total energy when struck with a club, and have longer flight distance.

In general, the rebounding performance of a golf ball is based on its initial velocity after being struck by the face of a golf club and its outgoing velocity after making impact with a hard surface. More particularly, the "coefficient of restitution" or "COR" of a golf ball refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize COR under these conditions. Balls with a higher rebound velocity have a higher COR value. To improve the resiliency and rebounding performance of the golf ball, the industry has focused primarily on the material and construction of the ball's core.

Golf balls having single-layered and multi-layered cores have been developed. For example, Bulpett et al, US Patent Application Publication US 2009/0227394 discloses multi-layered core construction comprising: a) an inner core formed from a first thermoset rubber composition; b) an intermediate core layer formed from a partially-neutralized or highly-neutralized ionomer composition; and c) an outer core formed from a second thermoset rubber composition. A cover layer having a thickness of about 0.01 to 0.05 inches and a surface hardness of about 60 Shore D or less is formed around the core.

Sullivan et al., US Patent Application Publication No. US 2009/0017940 discloses golf balls having a dual-core and a single-layered cover. The dual-core includes an inner core formed from a rubber composition and an outer core layer formed from a highly neutralized polymer (HNP) composition comprising an ethylene acid copolymer. In the HNP composition, at least 80% of all acid groups are neutralized. The inner core has an outer surface hardness of less than 80 Shore C; the outer core layer has an outer surface hardness of 56 Shore D or greater; and the cover layer has a material hardness of 60 Shore D or less.

Sullivan et al., U.S. Pat. Nos. 7,357,736 and 7,211,008 disclose golf balls comprising: a) an inner core layer formed from a diene rubber composition; (b) an outer core layer formed from a high modulus highly neutralized polymer (HNP) comprising a highly neutralized ethylene/(meth) acrylic acid copolymer having a modulus of from 45,000 psi to 150,000 psi; (c) an intermediate core layer disposed between the inner core layer and the outer core layer and formed from a low modulus HNP composition comprising a highly neutralized ethylene/(meth)acrylic acid/alkyl(meth) acrylate copolymer having a modulus of from 1,000 psi to 50,000 psi. In the HNP compositions, at least 80% of all acid groups are neutralized.

Although some conventional multi-layered core constructions are generally effective in providing high resiliency golf balls, there is a continuing need for improved core constructions in golf balls. Particularly, it would be desirable to have multi-layered core constructions that could be manufactured efficiently, have relatively low material costs, and provide the ball with high quality and performance properties. In particular, the core should provide the ball with good flight distance along with a comfortable and soft feel. The present invention provides core constructions and golf balls having such properties as well as other advantageous features, and benefits.

SUMMARY OF THE INVENTION

The present invention provides a multi-piece golf ball comprising a solid core having at least one layer and a cover having at least one layer. The golf ball may have different constructions. For instance, in one version, a golf ball having a dual-core is made; while in another version, a golf ball having a three-layered core is made. In preferred embodiment "A", a first ionomer composition comprising an ethylene acid copolymer and containing acid groups such that 70% or less of the acid groups are neutralized is used to form an inner core, and a second ionomer composition comprising an ethylene acid copolymer and containing acid groups such that greater than 70%, preferably 90% or greater, of the acid groups are neutralized is used to form an outer core layer.

Different materials can be used as the neutralizing agent. For example, the neutralizing agent can be a metal cation salt, wherein the metal cation is selected preferably from Zn, Na, Li, K, Ca, Mg, Ni, Mn, Cu, Ti, and Al, and mixtures thereof. More preferably, Ca or Mg cations are used in the composition. In one preferred version, the first ionomer composition does not contain a fatty acid or salt thereof, while the second ionomer composition does contain a fatty acid or salt thereof. The fatty acid is selected preferably from the group of stearic acid, behenic acid, erucic acid, oleic acid, linoleic acid, and dimerized derivatives, and mixtures thereof. More preferably, behenic acid or erucic acid is used in the composition.

In one version, the first ionomer composition may have a flex modulus of 1,000 to 50,000 psi and the second ionomer composition may have a flex modulus of 20,000 to 150,000 psi, wherein the modulus of the first ionomer composition is preferably at least 10% less than the modulus of the second ionomer composition. More particularly, in one embodiment, the flex modulus of the first ionomer composition is 30,000 or less and the flex modulus of the second ionomer composition is 40,000 or greater. In an alternative version, the first ionomer composition may have a flex modulus of 20,000 to 150,000 psi and the second ionomer composition may have a flex modulus of 1,000 to 50,000 psi, wherein the modulus of the first ionomer composition is preferably at least 10% greater than the modulus of the second ionomer composition. More particularly, in one embodiment, the flex modulus of the first ionomer composition is 40,000 or greater and the flex modulus of the second ionomer composition is 30,000 or less. The center of the inner core and surface of the outer core each has a hardness and preferably the surface hardness of the outer core layer (for example, 40 Shore D or greater) is greater than the center hardness of the inner core (for example, 25 Shore D or greater). In alternative versions, the center hardness of the inner core is greater than the surface hardness of the outer core layer. The cover may be single or multi-layered. For example, a single-layered cover having a thickness of about 0.020 to about 0.090 inches may be made from a thermoplastic or thermoset polymer material. In another instance, a dual-cover having inner and outer layers, wherein the hardness of the outer cover layer (for example, 65 Shore D or less) is less than the hardness of the inner cover layer may be prepared. The dual-core normally has a compression in the range of about 50 to about 130, preferably about 70 to about 110.

In preferred embodiment "B", the first ionomer composition is relatively highly neutralized, containing greater than 70% of the acid groups neutralized, and is used to form the inner core, while the second ionomer composition is relatively lowly neutralized, containing less than 70% of the acid groups neutralized, is used to form the outer core layer. In one version, the first ionomer composition has a flex modulus of 1,000 to 50,000 psi, preferably 30,000 or less and the second ionomer composition has a flex modulus of 20,000 to 150,000 psi, preferably 40,000 or greater. Alternatively, the first ionomer composition has a flex modulus of 20,000 to 150,000 psi, preferably 40,000 or greater and the second ionomer composition has a flex modulus of 1,000 to 50,000 psi, preferably 30,000 or less.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Figure 1:
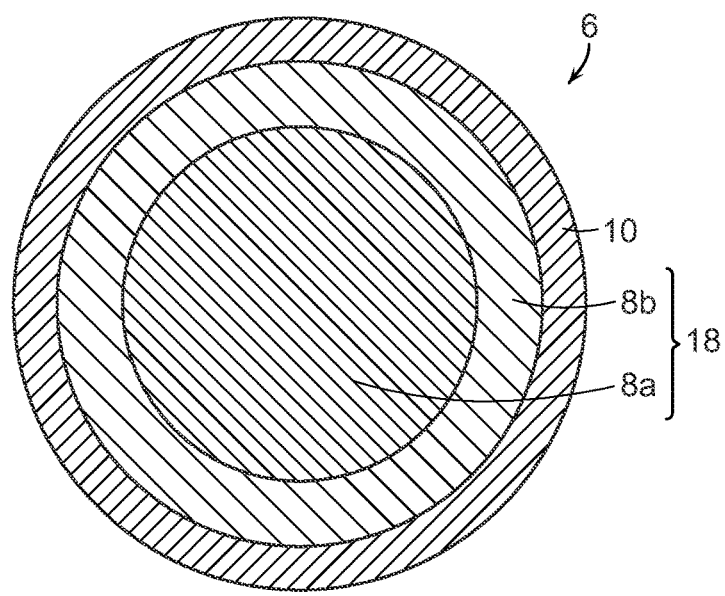
FIG. 1 is a cross-sectional view of a three-piece golf ball having a dual-core comprising an inner core/outer core, and a cover layer made in accordance with the present invention.

The present invention relates generally to golf balls containing at least one component made from a thermoplastic ionomeric composition. In one preferred version, a first ionomer composition comprising an ethylene acid copolymer and containing acid groups such that 70% or less of the acid groups are neutralized is used to form an inner core, and a second ionomer composition comprising an ethylene acid copolymer and containing acid groups such that greater than 70% of the acid groups, preferably 90% or greater, is used to form an outer core layer. In a second preferred version, the first ionomer composition contains acid groups neutralized to greater than 70% and is used to form the inner core, while the second ionomer composition contains acid groups neutralized to 70% or less and is used to form the outer core layer.

Golf balls having various constructions may be made in accordance with this invention. For example, golf balls having three-piece, four-piece, and five-piece constructions with single or multi-layered cover materials may be made The term, "layer" as used herein means generally any spherical portion of the golf ball. More particularly, in one version, a three-piece golf ball having a dual-core and a cover is made. The dual-core includes an inner core (center) and surrounding outer core layer. In another version, a four-piece golf ball comprising a dual-core and dual-cover comprising an inner cover and outer cover is made. In yet another construction, a four-piece or five-piece golf ball having a multi-layered core comprising an inner core (center), intermediate core layer, and outer core layer, may be made. The golf balls of this invention may further contain an intermediate layer(s). As used herein, the term, "intermediate layer" means a layer of the ball disposed between the core and cover. The intermediate layer also may be referred to as a casing or mantle layer. The diameter and thickness of the different layers along with properties such as hardness and compression may vary depending upon the construction and desired playing performance properties of the golf ball.

Low Modulus and High Modulus Core Layers

As discussed above, the present invention provides a golf ball comprising an inner core formed from a first ionomer composition comprising an ethylene acid copolymer containing acid groups neutralized to 70% or less; and an outer core layer formed from a second ionomer composition comprising an ethylene acid copolymer containing acid groups neutralized to greater than 70%; along with a cover that may be single or multi-layered. The present invention also provides a golf ball comprising an inner core formed from a first ionomer composition comprising an ethylene acid copolymer containing acid groups neutralized to greater than 70%; and an outer core layer formed from a second ionomer composition comprising an ethylene acid copolymer containing acid groups neutralized to 70% or less; along with a cover that may be single or multi-layered.

In some versions, the first ionomer composition is relatively flexible having a relatively low flex modulus of 1,000 to 50,000 psi and the second ionomer composition is relatively stiff having a relatively high flex modulus of 20,000 to 150,000 psi. That is, in this version, the modulus of the first ionomer composition is less than the modulus of the second ionomer composition. In alternative versions, the first ionomer composition has a relatively high flex modulus of 20,000 to 150,000 psi and the second ionomer composition has a relatively low flex modulus of 1,000 to 50,000 psi. That is, in this version, the modulus of the first ionomer composition is greater than the modulus of the second ionomer composition. More particularly, the low modulus ionomer material generally has a modulus with a lower limit of 1,000 or 5,000 or 10,000 psi or 15,000 psi and an upper limit of 17,000 or 25,000 or 28,000 or 30,000 or 35,000 or 45,000 or 50,000. The hardness of the low modulus material is generally 30 Shore C or greater; or 40 Shore C or greater; or 50 Shore C or greater, or preferably within a range having a lower limit of 30 or 40 or 50 Shore C and an upper limit of 60 or 70 or 80 or 87 Shore C. On the other hand, the high modulus ionomer material preferably has a modulus within the range having a lower limit of 20,000 or 30,000 or 40,000 or 45,000 or 50,000 or 55,000 or 60,000 psi and an upper limit of 72,000 or 75,000 or 100,000 or 150,000 and a hardness of 80 Shore C or greater, or 87 Shore C or greater, or 90 Shore C or greater, or within a range having a lower limit of 80 or 87 or 90 Shore C and an upper limit of 90 or 95 or 100 Shore C. In a preferred embodiment, the modulus of the relatively low modulus ionomer material is at least 10% less, or at least 20% less, or at least 30% less than the modulus of the relatively high modulus ionomer material.

By the term, "modulus" as used herein, it is meant flexural modulus which is the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. The formula used to calculate the flexural modulus from the recorded load (F) and deflection (D) is:

$$E_B = \frac{3}{4} \frac{FL^3}{bd^3 D}$$

wherein,
L=span of specimen between supports (m);
b=width (m); and
d=thickness (m)

If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. Flexural modulus can be determined in accordance with ASTM D790 standard among other testing procedures.

Ethylene Acid Copolymers

Suitable ethylene acid copolymers that may be used to form the compositions of this invention are generally referred to as copolymers of ethylene; $C_3$ to $C_8$ α,β-ethylenically unsaturated mono- or dicarboxylic acid; and optional softening monomer. Copolymers may include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl(meth)acrylate, ethylene/(meth)acrylic acid/methyl(meth)acrylate, ethylene/(meth)acrylic acid/ethyl(meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth)acrylic acid, ethacrylic acid, maleic acid, crotonic acid, fumaric acid, itaconic acid. (Meth)acrylic acid is most preferred. As used herein, "(meth)acrylic acid" means methacrylic acid and/or acrylic acid. Likewise, "(meth)acrylate" means methacrylate and/or acrylate.

When a softening monomer is included, such copolymers are referred to herein as E/X/Y-type copolymers, wherein E is ethylene; X is a $C_3$ to $C_8$ α,β-ethylenically unsaturated mono- or dicarboxylic acid; and Y is a softening monomer. The softening monomer is typically an alkyl (meth)acrylate, wherein the alkyl groups have from 1 to 8 carbon atoms. Preferred E/X/Y-type copolymers are those wherein X is (meth)acrylic acid and/or Y is selected from (meth)acrylate, n-butyl(meth)acrylate, isobutyl(meth)acrylate, methyl (meth)acrylate, and ethyl(meth)acrylate. More preferred E/X/Y-type copolymers are ethylene/(meth)acrylic acid/n-butyl acrylate, ethylene/(meth)acrylic acid/methyl acrylate, and ethylene/(meth)acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α,β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The acidic groups in the copolymeric ionomers are partially or totally neutralized with a cation source. Suitable cation sources include metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof. The metal cation salts provide the cations capable of neutralizing (at varying levels) the carboxylic acids of the ethylene acid copolymer and fatty acids, if present, as discussed further below. These include, for example, the sulfate, carbonate, acetate, oxide, or hydroxide salts of lithium, sodium, potassium, magnesium, calcium, barium, lead, tin, zinc, aluminum, manganese, nickel, chromium, copper, or a combination thereof. Preferred metal cation salts are calcium and magnesium-based salts. High surface area cation particles such as micro and nano-scale cation particles are preferred. The amount of cation used in the composition is readily determined based on desired level of neutralization.

For example, ionomeric resins having acid groups that are neutralized from about 10 percent to about 100 percent may be used. In one ionomer composition, the acid groups are partially neutralized. That is, the neutralization level is from about 10% to about 70%, more preferably 20% to 60%, and most preferably 30 to 50%. These ionomer compositions, containing acid groups neutralized to 70% or less, may be referred to ionomers having relatively low neutralization levels.

As discussed above, ethylene acid copolymer ionomer resins, having relatively low neutralization levels, may be used in accordance with this invention and suitable examples of these polymers are described in the following Tables I and II.

TABLE I

Composition of Ethylene Acid Copolymers with Relatively Low Levels of Neutralization

| Grade Names | % Ester Co-Monomer | Metal Type | Weight % Acid | Mole % Acid | Melt Index | Weight % Metal | Mol % Neutralization |
|---|---|---|---|---|---|---|---|
| 6320 | 23.5 | Mg | 9.0 | 3.11 | 0.95 | 0.63 | 49.6 |
| 7940 | — | Li | 15.0 | 5.44 | 2.6 | 0.51 | 42.2 |
| 8020 | 10 | Na | 10.0 | 3.48 | 1.2 | 1.05 | 39.3 |
| 8150 | — | Na | 19.0 | 7.10 | 4.5 | 2.30 | 45.3 |
| 8320 | 23.5 | Na | 9.0 | 3.11 | 1.0 | 1.25 | 52.0 |
| 8528 | — | Na | 10.0 | 3.48 | 1.3 | 1.47 | 55.0 |
| 8660 | — | Na | 11.0 | 3.86 | 10.0 | 1.05 | 35.7 |
| 8920 | — | Na | 15.0 | 5.44 | 0.93 | 2.25 | 56.2 |
| 8940 | — | Na | 15.0 | 5.44 | 2.8 | 1.21 | 30.2 |
| 8945 | — | Na | 15.0 | 5.44 | 4.5 | 2.05 | 51.2 |
| 9020 | 10 | Zn | 10.0 | 3.48 | 1.0 | 2.54 | 66.9 |
| 9120 | — | Zn | 19.0 | 7.10 | 1.3 | 2.57 | 35.6 |
| 9150 | — | Zn | 19.0 | 7.10 | 4.5 | 2.73 | 37.8 |
| 9320 | 23.5 | Zn | 9.0 | 3.11 | 0.75 | 1.41 | 41.3 |
| 9520 | — | Zn | 10.5 | 3.67 | 1.05 | 2.75 | 69.0 |
| 9650 | — | Zn | 11.0 | 3.86 | 5.2 | 2.58 | 61.8 |
| 9721 | — | Zn | 12.0 | 4.25 | 1.0 | 2.17 | 47.6 |
| 9730 | — | Zn | 12.0 | 4.25 | 1.8 | 1.69 | 37.1 |
| 9910 | — | Zn | 15.0 | 5.44 | 0.7 | 3.45 | 60.6 |
| 9945 | — | Zn | 15.0 | 5.44 | 4.2 | 3.10 | 54.4 |
| 9950 | — | Zn | 15.0 | 5.44 | 5.0 | 1.11 | 19.5 |
| AD1022 | | Zn | | | 4.5 | | |
| AD1043 | | Mg | | | 4.5 | | |
| AD1092 | — | Mg | 19.0 | | 2.8 | | Med. |

TABLE II

Properties of Ethylene Acid Copolymers with Relatively Low Levels of Neutralization

| Grade Names | Flex Modulus (ksi) | Stiffness (Kg-f/cm$^2$) | Shore D Hardness | Vicat Softening Point (° C.) | MP (° C.) | FP (° C.) | Solid Sphere Atti Comp. | CoR |
|---|---|---|---|---|---|---|---|---|
| 6320 | 7.7 | 404 | 43 | 49 | 70 | 34 | 76 | 0.637 |
| 7940 | 61 | 3380 | 68 | 63 | 91 | 48 | 161 | 0.745 |
| 8020 | 14 | 1006 | 56 | 61 | 82 | 67 | | |
| 8150 | 71 | | 65 | 53 | 84 | 40 | 189 | 0.785 |
| 8320 | 4.4 | 251 | 36 | 47 | 70 | 38 | 76 | 0.590 |
| 8528 | 32 | 1608 | 60 | 73 | 93 | 66 | 153 | 0.646 |
| 8660 | 34 | 1710 | 62 | 71 | 95 | 74 | 156 | 0.638 |
| 8920 | 51 | | 66 | 58 | 88 | 48 | 156 | 0.752 |
| 8940 | 51 | 2875 | 65 | 63 | 94 | 59 | 165 | 0.720 |
| 8945 | 65 | 3005 | 65 | 71 | 88 | 47 | 162 | 0.745 |
| 9020 | 14 | 1101 | 55 | 57 | 81 | 64 | 125 | 0.587 |
| 9120 | 62 | | 66 | 60 | 86 | 53 | 159 | 0.709 |
| 9150 | 52 | 3703 | 63 | 57 | 82 | 42 | 159 | 0.707 |
| 9320 | 4.3 | | 40 | 48 | 70 | 37 | 56 | 0.567 |
| 9520 | 38 | | 60 | 74 | 96 | 76 | 150 | 0.622 |
| 9650 | 32 | 1624 | 63 | 71 | 92 | 73 | 149 | 0.614 |
| 9721 | 32 | | 61 | 71 | 92 | 76 | 153 | 0.625 |
| 9730 | 30 | 1616 | 63 | 73 | 90 | 76 | | |
| 9910 | 48 | 2820 | 64 | 62 | 86 | 46 | 163 | 0.690 |
| 9945 | 47 | | 61 | 60 | 87 | 51 | 162 | 0.674 |
| 9950 | 37 | | 62 | 66 | 87 | 73 | | |
| AD1022 | 4.5 | | 37 | | 77 | | 26 | 0.500 |
| AD1043 | 8 | | 40 | | 77 | | 68 | 0.670 |
| AD1092 | 89 | | 64 | 56 | 86 | | 163 | 0.771 |

Conversely, the ionomer composition may contain acid groups that are highly or fully-neutralized. That is, the neutralization level is greater than 70%, preferably at least 90% and even more preferably at least 100%. In another embodiment, an excess amount of neutralizing agent, that is, an amount greater than the stoichiometric amount needed to neutralize the acid groups, may be used. That is, the acid groups may be neutralized to 100% or greater, for example 110% or 120% or greater. In one preferred embodiment, a high acid ethylene acid copolymer containing about 19 to 20 wt. % methacrylic or acrylic acid is neutralized with zinc and sodium cations to a 95% neutralization level.

As discussed above, ethylene acid copolymer ionomer resins, which are highly neutralized, may be used in accordance with this invention and suitable examples of these highly neutralized polymers (HNPs) are described in the following Table III (dipolymers) and Tables IV and V (terpolymers). Examples of suitable HNPs are further described in Degaravilla, US Patent Application Publications US 2009/0118040 and US 20101/0304893, the disclosures of which are hereby incorporated by reference.

TABLE III

Ethylene Acid Copolymers with Relatively High Levels of Neutralization

| | Base Resin Props. | | | HNP Properties | | | | | |
| | | | | | | | Shore D | | Flex |
| Ex # | Resin | % Acid/ Type | % Fatty/ Type* | % Neut. | Atti Comp. | Sphere CoR | Sphere | Plaque | Mod. (Kpsi) | Melt Index |
|---|---|---|---|---|---|---|---|---|---|---|
| 1 | R-17 | 21% AA | 36.8% Ol | 125% | 129 | 0.884 | 58.7 | — | — | 0.03 |
| 2 | R-14 | 20% MAA | 35.9% Ol | 139% | 130 | 0.864 | 56.0 | 60 | 24.5 | 0.63 |
| 3 | R-14 | 20% MAA | 36.7% Ol | 162% | 128 | 0.862 | 50.6 | 57 | 20.9 | 0.45 |
| 4 | R-14 | 20% MAA | 38.3% Ol | 170% | 120 | 0.866 | 52.0 | 57 | 21.5 | 0.59 |
| 5 | R-14 | 20% MAA | 39.9% Ol | 178% | 119 | 0.867 | 48.5 | 55 | 20.4 | 0.72 |
| 6 | R-15 | 19% MAA | 41% Ol | 134% | 115 | 0.868 | 48.0 | 54 | 16.8 | 1.2 |
| 7 | R-15 | 19% MAA | 41% Ol | 134% | 116 | 0.866 | 51.3 | 57 | 20 | 0.6 |
| 8 | R-15 | 19% MAA | 36.9% Ol | 146% | 119 | 0.863 | 49.6 | 57 | 21.5 | 0.5 |
| 9 | R-15 | 19% MAA | 39% Ol | 160% | 128 | 0.865 | 51.0 | 57 | 20.9 | 0.61 |
| 10 | R-15 | 19% MAA | 46% Ol | 160% | 115 | 0.862 | 49.2 | 54 | 18.3 | 0.62 |
| 11 | R-15 | 19% MAA | 41.4% Ol | 174% | 116 | 0.867 | 47.1 | 56 | 20.1 | 0.75 |
| 12 | R-16 | 19% MAA | 35% Ol | 126% | 96 | 0.860 | 53.0 | 57 | 20.8 | 1.2 |
| 13 | R-16 | 19% MAA | 39.9% Ol | 174% | 109 | 0.862 | 47.4 | 56 | 17.2 | 0.96 |
| 14 | R-18 | 18% AA | 36% Ol | 81% | 122 | 0.819 | — | 57 | 20.6 | 0.8 |
| 15 | R-18 | 18% AA | 40% Ol | 97% | 125 | 0.818 | — | — | — | 0.75 |
| 16 | R-18 | 18% AA | 34.8% Ol | 150% | 108 | 0.867 | 55.9 | — | — | 0.22 |
| 17 | R-18 | 18% AA | 40.4% Er | 153% | 97 | 0.872 | 50.1 | — | — | 0.46 |
| 18 | R-19 | 15.4% AA | 40% Ol | 98% | 115 | 0.821 | — | — | — | 0.38 |

R-14: An ethylene methacrylic acid (MAA) dipolymer with 20 weight % of MAA, and a Melt Index of 500.
R-15: An ethylene methacrylic acid (MAA) dipolymer with 19 weight % of MAA, and a Melt Index of 305.
R-16: An ethylene methacrylic acid (MAA) dipolymer with 19 weight % of MAA, and a Melt Index of 250.
R-17: An ethylene acrylic acid (AA) dipolymer with 21 weight % of AA, and a Melt Index of 300.
R-18: An ethylene acrylic acid (AA) dipolymer with 18 weight % of AA, and a Melt Index of 60.
R-19: An ethylene acrylic acid (AA) dipolymer with 15.4 weight % of AA, and a Melt Index of 80.
*Fatty Acid Type: Ol—Oleic acid and Er—Erucic Acid As shown above in above Table III, the flex modulus of some relatively highly neutralized ethylene acid copolymers may fall within the range of about 10,000 to about 40,000 psi, preferably 15,000 to 35,000 psi, in some instances. Such ionomer compositions may be used to form a low modulus (or high modulus) core layer in accordance with this invention.

TABLE IV

Ethylene Acid Terpolymers with Relatively High Levels of Neutralization

| | Base Resin Properties | | | HNP Properties | | | | |
| | | | | | | | Shore D | |
| Ex # | Resin | % Acid/ Type/% Ester | % Fatty/ Type | % Neut. | Atti Comp | Sphere CoR | Sphere | Plaque | HNP MI |
|---|---|---|---|---|---|---|---|---|---|
| 19 | R-11 | 21.3% AA/2% nBA | 40.5% 50/50 O/E | 103% | 124 | 0.886 | 55.3 | — | 0.29 |
| 20 | R-11 | 21.3% AA/2% nBA | 44% 50/50 O/E | 123% | 118 | 0.889 | 51.5 | — | 0.34 |
| 21 | R-11 | 21.3% AA/2% nBA | 30.7% oleic | 105% | 141 | 0.884 | 58.1 | — | 0.01 |
| 22 | R-11 | 21.3% AA/2% nBA | 42.6% oleic | 105% | 131 | 0.889 | 54.5 | — | 0.37 |
| 23 | R-12 | 21.4% AA/4% nBA | 31.6% oleic | 99% | 140 | 0.866 | 59.1 | — | 0.17 |
| 24 | R-12 | 21.4% AA/4% nBA | 41.9% oleic | 105% | 127 | 0.888 | 53.3 | — | 0.48 |
| 25 | R-12 | 21.4% AA/4% nBA | 34.3% oleic | 134% | 131 | 0.872 | 57 | — | 0.06 |

TABLE IV-continued

Ethylene Acid Terpolymers with Relatively High Levels of Neutralization

| | Base Resin Properties | | | HNP Properties | | | | |
|---|---|---|---|---|---|---|---|---|
| Ex # | Resin | % Acid/ Type/% Ester | % Fatty/ Type | % Neut. | Atti Comp | Sphere CoR | Shore D Sphere | Shore D Plaque | HNP MI |
| 26 | R-12 | 21.4% AA/4% nBA | 39.3% 50/50 O/E | 102% | 123 | 0.884 | 55.1 | — | 0.25 |
| 27 | R-2 | 20.8% AA/2% nBA | 36.7 oleic | 124% | 127 | 0.880 | 59.6 | — | 0.06 |
| 28 | R-7 | 19.5% MAA/4% nBA | 29.5% oleic | 150% | 122 | 0.835 | 53.6 | — | 0.31 |
| 29 | R-7 | 19.5% MAA/4% nBA | 32.1% oleic | 142% | 115 | 0.835 | 52.6 | — | 0.89 |
| 30 | R-7 | 19.5% MAA/4% nBA | 38.7% oleic | 143% | 111 | 0.853 | 49.7 | — | 2.58 |
| 31 | R-7 | 19.5% MAA/4% nBA | 38% oleic | 195% | 112 | 0.853 | 48.2 | — | 0.93 |
| 32 | R-9 | 17.6% AA/4% nBA | 30.5% oleic | 122% | 123 | 0.865 | 54.2 | — | 0.16 |
| 33 | R-9 | 17.6% AA/4% nBA | 32.1% oleic | 104% | 125 | 0.866 | 52.7 | — | 0.46 |
| 34 | R-9 | 17.6% AA/4% nBA | 40% oleic | 104% | 116 | 0.882 | 49.5 | — | 1.12 |
| 35 | R-9 | 17.6% AA/4% nBA | 31% oleic | 154% | 121 | 0.862 | 58.1 | — | 0.01 |
| 36 | R-9 | 17.6% AA/4% nBA | 39.6% oleic | 135% | 120 | 0.880 | 50.7 | — | 0.35 |
| 37 | R-8 | 17.5% MAA/8% nBA | 30.8% oleic | 138% | 107 | 0.828 | 47.3 | — | 2.21 |
| 38 | R-8 | 17.5% MAA/8% nBA | 29.4% oleic | 152% | 112 | 0.842 | 51.1 | — | 0.01 |
| 39 | R-8 | 17.5% MAA/8% nBA | 36.8% oleic | 160% | 102 | 0.844 | 46.8 | — | 6.85 |
| 40 | R-8 | 17.5% MAA/8% nBA | 38.2% oleic | 215% | 104 | 0.847 | 47 | — | 4.55 |
| 41 | R-6 | 15.7% MAA/7.8% nBA | 40% oleic | 153% | 97 | 0.868 | 47.8 | — | 0.95 |
| 42 | R-6 | 15.7% MAA/7.8% nBA | 37.5% oleic | 129% | 97 | 0.866 | 48.6 | — | 1.05 |

R-2: A 50/50 blend by weight of the following: i) an ethylene/acrylic acid (AA)/n-butyl acrylate (nBA) terpolymer with 20.5 weight % of AA and 4.0 weight % of nBA, and a Melt Index of about 750; and ii) an ethylene/AA copolymer with 21.0 weight % of AA and a Melt Index of 300.
R-6: An ethylene/methacrylic acid (MAA)/nBA terpolymer with 15.7 weight % of MAA and 7.8 weight % of nBA, and a Melt Index of 122.
R-7: An ethylene/MAA/nBA terpolymer with 19.5 weight % of MAA and 4.0 weight % of nBA, and a Melt Index of 265.
R-8: An ethylene/MAA/nBA terpolymer with 17.5 weight % of MAA and 8.0 weight % of nBA, and a Melt Index of 280.
R-9: An ethylene/AA/nBA terpolymer with 17.6 weight % of AA and 4.0 weight % of nBA, and a Melt Index of 285.
R-11: An ethylene/AA/nBA terpolymer with 21.3 weight % of AA and 2.0 weight % of nBA, and a Melt Index of 275.
R-12: An ethylene/AA/nBA terpolymer with 21.4 weight % of AA and 4.0 weight % of nBA, and a Melt Index of 275.
* Fatty Acid Type: Oleic Acid and Erucic Acid O—Oleic acid and E—Erucic Acid.

TABLE V

Ethylene Acid Terpolymers with Relatively High Levels of Neutralization

| | Base Resin Properties | | | HNP Properties | | | | |
|---|---|---|---|---|---|---|---|---|
| Ex # | Resin | % Acid/ Type/% Ester | % Fatty/ Type | % Neut. | Atti Comp | Sphere CoR | Shore D Sphere | Shore D Plaque | HNP MI |
| 43 | R-10 | 15.4% AA/8% nBA | 30% oleic | 114% | 117 | 0.870 | 53.6 | — | 0.29 |
| 44 | R-10 | 15.4% AA/8% nBA | 39.8% oleic | 138% | 111 | 0.875 | 48.3 | — | 0.75 |
| 45 | R-10 | 15.4% AA/8% nBA | 36.5% oleic | 142% | 101 | 0.875 | 49.6 | — | 0.21 |
| 46 | R-1 | 12% AA/17.6% nBA | 36.5% oleic | 135% | 118 | 0.868 | 47.7 | — | 0.35 |
| 47 | R-3 | 10.5% AA/15.5% nBA | 35% oleic | 102% | 101 | 0.859 | 45.8 | — | 1 |
| 48 | R-3 | 10.5% AA/15.5% nBA | 34.9% oleic | 124% | 82 | 0.850 | 47.8 | — | 0.91 |
| 49 | R-3 | 10.5% AA/15.5% nBA | 37.5% oleic | 127% | 75 | 0.850 | 48.6 | — | 1.05 |
| 50 | R-13 | 9% MAA/15.5% nBA | 35.1% oleic | 120% | 62 | 0.817 | 39.2 | — | 3.68 |
| 51 | R-13 | 9% MAA/15.5% nBA | 38.7% erucic | 125% | 57 | 0.817 | 36.4 | — | 7.74 |
| 52 | R-4 | 6.2% AA/28% nBA | 35% oleic | 145% | 75 | 0.826 | 41.8 | — | 1 |
| 53 | R-4 | 6.2% AA/28% nBA | 35% oleic | 124% | 51 | 0.807 | 35.8 | — | 2.63 |
| 54 | R-4 | 6.2% AA/28% nBA | 39.8% erucic | 121% | 41 | 0.805 | 33.6 | — | 5.94 |
| 55 | R-5 | 6.2% AA/28% nBA | 35% oleic | 115% | NA | NA | NA | NA | NA |
| HPF 1000 | | 9% AA/15.5% nBA | ~40% St. A | ~100 | 110 | 0.833 | 55 | 52 | — |
| HPF 2000 | | 10.5% AA/15.5% nBA | ~40% oleic acid | ~100 | 123 | 0.863 | 47 | — | — |
| AD 1030 | | NA | NA | ~100 | 73 | 0.824 | — | — | — |
| AD 1035 | | NA | NA | ~100 | 66 | 0.826 | — | — | — |
| AD 1040 | | NA | NA | ~100 | 123 | 0.852 | — | — | — |

R-1: An ethylene/acrylic acid (AA)/n-butyl acrylate (nBA) terpolymer with 12 weight % of AA and 17.6 weight % of nBA, and a Melt Index of 95.
R-3: An ethylene/AA/nBA terpolymer with 10.5 weight % of AA and 15.5 weight % of nBA, and a Melt Index of 60.
R-4: An ethylene/AA/nBA terpolymer with 6.2 weight % of AA and 28.0 weight % of nBA, and a Melt Index of 60.
R-5: An ethylene/AA/nBA terpolymer with 6.2 weight % of AA and 28.0 weight % of nBA, and a Melt Index of 300.
R-10: An ethylene/AA/nBA terpolymer with 15.4 weight % of AA and 8.0 weight % of nBA, and a Melt Index of 300.
R-13: An ethylene/MAA/nBA terpolymer with 9.0 weight % of MAA and 15.5 weight % of nBA, and a Melt Index of 60.
HPF-1000, HPF-2000, AD-1030, AD-1035, and AD-1040: formulations unavailable - compositions are commercially available from DuPont.

The above-described ethylene acid copolymer compositions in Tables III-V were prepared according to the following general procedure. The organic acid, ethylene acid copolymer, and neutralizing agent (Mg(OH)$_2$ concentrate)

were melt-blended in a Werner & Pfleiderer twin screw extruder. The amounts of the acid and copolymer were added so that the resulting blend contained 25 to 45 weight % of the organic acid. The blend was treated with sufficient neutralizing agent so that the acid moieties of the organic acid and the acid copolymer were neutralized to the level indicated in above Tables III-V.

The highly neutralized ethylene acid copolymer compositions described in Tables IV-V have other physical properties, some of which are described below in Table VI. In particular, the flex modulus of some relatively highly neutralized ethylene acid copolymers may fall within the range of about 1,000 to about 20,000 psi, preferably 3,000 to 10,000 in some instances. Such ionomer compositions may be used to form a low modulus (or high modulus) core layer in accordance with this invention.

TABLE VI

Properties of Highly Neutralized Ethylene Acid Copolymers
(Flex Modulus of 5,000 PSI or Less)

| Resin | Tensile Strength (psi)* | Elongation (%)* | Shore D Hardness | Flex Modulus (psi)** |
|---|---|---|---|---|
| HPF 1000 | 2,600 | 430% | 55 | 31,000 |
| HPF 2000 | 1,800 | 330% | 47 | 12,000 |

*Tensile Strength and Elongation were measured according to ASTM D638.
***Flex Modulus was measured according to ASTM D790.

Other highly neutralized ethylene acid copolymer compositions, examples of which are described below in Table VII, may be used in accordance with this invention. In particular, the flex modulus of the relatively highly neutralized ethylene acid copolymers may fall within the range of about 10,000 to about 80,000 psi, preferably 20,000 to 70,000 in some instances. Such ionomer compositions may be used to form a low modulus (or high modulus) core layer. Examples of suitable HNPs are further described in Sullivan et al., U.S. Pat. No. 7,468,006, the disclosure of which is hereby incorporated by reference.

et al., U.S. Pat. No. 6,756,436, the disclosure of which is hereby incorporated by reference. In the present invention such ionic plasticizers are optional. In one preferred embodiment, the thermoplastic ionomer composition, containing acid groups neutralized to 70% or less, does not include a fatty acid or salt thereof, or any other ionic plasticizer. On the other hand, the thermoplastic ionomer composition, containing acid groups neutralized to greater than 70%, includes an ionic plasticizer, particularly a fatty acid or salt thereof. For example, the ionic plasticizer may be added in an amount of 0.5 to 10 pph, more preferably 1 to 5 pph. The organic acids may be aliphatic, mono- or multi-functional (saturated, unsaturated, or multi-unsaturated) organic acids. Salts of these organic acids may also be employed. Suitable fatty acid salts include, for example, metal stearates, laureates, oleates, palmitates, pelargonates, and the like. For example, fatty acid salts such as zinc stearate, calcium stearate, magnesium stearate, barium stearate, and the like can be used. The salts of fatty acids are generally fatty acids neutralized with metal ions. The metal cation salts provide the cations capable of neutralizing (at varying levels) the carboxylic acid groups of the fatty acids. Examples include the sulfate, carbonate, acetate and hydroxide salts of metals such as barium, lithium, sodium, zinc, bismuth, chromium, cobalt, copper, potassium, strontium, titanium, tungsten, magnesium, cesium, iron, nickel, silver, aluminum, tin, or calcium, and blends thereof. It is preferred the organic acids and salts be relatively non-migratory (they do not bloom to the surface of the polymer under ambient temperatures) and non-volatile (they do not volatilize at temperatures required for melt-blending).

The final ionomeric compositions of this invention may contain additional materials such as, for example, a small amount of ionic plasticizer, which is particularly effective at improving the processability of highly-neutralized ionomers. For example, the ionic plasticizer may be added in an amount of 0.5 to 10 pph, more preferably 1 to 5 pph. In addition to the fatty acids and salts of fatty acids discussed above, other suitable ionic plasticizers include, for example,

TABLE VII

Properties of Highly Neutralized Ethylene Acid Copolymers
(Flex Modulus of 10,000 PSI or Greater)

| Example | Copolymer* | Cation Source | Fatty Acid | Flex Modulus** (psi) | Shore D Hardness*** |
|---|---|---|---|---|---|
| 56 | dipolymer | Ca/Mg | Stearic | 71,600 | 57 |
| 57 | dipolymer | Ca/Li | Stearic | 70,300 | 58 |
| 58 | dipolymer | Ca | Stearic | 70,100 | 60 |
| 59 | dipolymer | Ca/Zn | Stearic | 60,400 | 58 |
| 60 | terpolymer | Mg | Stearic | 38,300 | 52 |
| 61 | dipolymer | Mg | Oleic | 27,600 | 52 |
| 62 | terpolymer | Mg | Oleic | 16,300 | 45 |
| 63 | Terpolymer | Mg | Oleic | 10,600 | 40 |
| 64 | terpolymer | Mg | Oleic | 10,400 | 39 |
| 65 | dipolymer | Ca | Stearic | 60,300 | 37 |
| 66 | dipolymer | Ca | Stearic | 69,300 | 60 |
| 67 | terpolymer | Mg | Erucic | 7,300 | 37 |

*Copolymer Type: dipolymer - poly(ethylene-acrylic acid) terpolymer - Poly(ethylene-n-butyl acrylate-acrylic acid)
**Flex Modulus was measured according to ASTM D790-03, Procedure B.
***Hardness was measured according to ASTM D-2240.

Additional Materials in Ionomer Compositions

In the present invention, it is not necessary that any "ionic plasticizer" such as organic acids or salts of organic acids, particularly fatty acids, be added to the ionomer resin. Such ionic plasticizers are used to make conventional ionomer composition more processable as described in Rajagopalan polyethylene glycols, waxes, bis-stearamides, minerals, and phthalates. In another embodiment, an amine or pyridine compound is used, preferably in addition to a metal cation. Suitable examples include, for example, ethylamine, methylamine, diethylamine, tert-butylamine, dodecylamine, and the like.

Fillers, fibers, flakes also may be included in the final ionomeric composition. Particularly preferred additives of this nature include, but are not limited to, very-high-surface-area fillers that have an affinity for the acid groups in ionomer. In particular, fillers, fibers or flakes having cationic nature such that they may also contribute to the neutralization of the ionomer are suitable. Aluminum oxide comprising fillers are preferred. Also, silica, fumed silica, or precipitated silica, such as those sold under the tradename HISIL from PPG Industries, or carbon black. Nano-scale materials are also preferred and include, but are not limited to, nanotubes, nanoflakes, nanofillers, or nanoclays.

Other additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, tungsten, tungsten carbide, silica, lead silicate, regrind (recycled material), clay, mica, talc, nano-fillers, carbon black, glass flake, milled glass, and mixtures thereof. Suitable additives are more fully described in, for example, Rajagopalan et al., U.S. Patent Application Publication No. 2003/0225197, the entire disclosure of which is hereby incorporated herein by reference. In a particular embodiment, the total amount of additive(s) and filler(s) present in the final thermoplastic ionomeric composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the ionomeric composition. In a particular aspect of this embodiment, the final thermoplastic ionomeric composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the final thermoplastic ionomeric composition is modified with organic fiber micropulp, as disclosed, for example, in Chen, U.S. Pat. No. 7,504,448, the entire disclosure of which is hereby incorporated herein by reference. In another version, the ionomer compositions may contain carbon fibers or carbon fiber sheets comprising a weave of thin carbon fibers held together in a resin. In yet another version, the ionomer compositions may contain forged composite material composed of bundles of microscopic carbon fibers held together in a resin. These turbostratic carbon fibers are randomly dispersed in the resin. The structure of the forged composite material differs over traditional carbon fiber sheets. The forged composite material contains discontinuous fibers intertwined in the resin; while ordinary carbon fiber sheets are woven—they contain a weave of fibers. As a result, the forged composite material is very lightweight and has high mechanical strength.

Other suitable thermoplastic polymers that may be included in the final ionomer composition of this invention include, but are not limited to, the following polymers (including homopolymers, copolymers, and derivatives thereof.)

(a) polyesters, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof;

(b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof;

(c) polyurethanes, polyureas, polyurethane-polyurea hybrids, and blends of two or more thereof;

(d) fluoropolymers, such as those disclosed in U.S. Pat. Nos. 5,691,066, 6,747,110 and 7,009,002, the entire disclosures of which are hereby incorporated herein by reference, and blends of two or more thereof;

(e) polystyrenes, such as poly(styrene-co-maleic anhydride), acrylonitrile-butadiene-styrene, poly(styrene sulfonate), polyethylene styrene, and blends of two or more thereof;

(f) polyvinyl chlorides and grafted polyvinyl chlorides, and blends of two or more thereof;

(g) polycarbonates, blends of polycarbonate/acrylonitrile-butadiene-styrene, blends of polycarbonate/polyurethane, blends of polycarbonate/polyester, and blends of two or more thereof;

(h) polyethers, such as polyarylene ethers, polyphenylene oxides, block copolymers of alkenyl aromatics with vinyl aromatics and polyamicesters, and blends of two or more thereof;

(i) polyimides, polyetherketones, polyamideimides, and blends of two or more thereof; and (j) polycarbonate/polyester copolymers and blends.

Furthermore, the resulting thermoplastic ionomer composition may contain natural and synthetic rubbers such as, for example, polybutadiene, polyisoprene, ethylene propylene rubber (EPR), ethylene propylene diene rubber (EPDM), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, and polystyrene elastomers.

The ionomer compositions may contain a blend of two or more ionomers. For example, the composition may contain a 50/50 wt. % blend of two different highly-neutralized ethylene/methacrylic acid copolymers. In another version, the composition may contain a blend of one or more ionomers and a maleic anhydride-grafted non-ionomeric polymer. The non-ionomeric polymer may be a metallocene-catalyzed polymer. In another version, the composition contains a blend of a highly-neutralized ethylene/methacrylic acid copolymer and a maleic anhydride-grafted metallocene-catalyzed polyethylene. In yet another version, the composition contains a material selected from the group consisting of highly-neutralized ionomers optionally blended with a maleic anhydride-grafted non-ionomeric polymer; polyester elastomers; polyamide elastomers; and combinations of two or more thereof.

In accordance with the present invention, golf balls containing dual-cores formed from thermoplastic ionomer compositions containing acid groups neutralized to 70% or less and thermoplastic ionomer compositions containing acid groups neutralized to greater than 70% have several advantageous properties. For example, the ionomer compositions can be used to make a dual-core that provides the golf ball with good rebounding properties (distance) without sacrificing a nice feel to the ball. The resulting ball has a relatively high COR allowing it to reach high velocity when struck by a golf club. Thus, the ball tends to travel a greater distance which is particularly important for driver shots off the tee. At the same time, the ionomer composition is not excessively hard and it helps provide the ball with a soft and comfortable feel. The golf player experiences a better sense of control and natural feeling ball when making the shot. In general, the cores of this invention typically have a COR of about 0.76 or greater; and preferably about 0.80 or greater. The compression of the core preferably is about 50 to about 130 and more preferably in the range of about 70 to about 110.

Core Structure

As discussed above, the core is preferably a dual-core comprising an inner core (center) and surrounding outer core layer. In one preferred embodiment, the inner core is formed from a first ionomer composition comprising an ethylene acid copolymer containing acid groups such that the acid groups are neutralized to 70% or less; and an outer core layer formed from a second ionomer composition comprising an ethylene acid copolymer containing acid groups such that the acid groups are neutralized to greater than 70%. In a second preferred embodiment, the relatively highly neutralized ionomer composition (acid groups neutralized to greater than 70%) is used to form the inner core; and the relatively lowly neutralized ionomer composition (acid groups neutralized to 70% or less) is used to form the outer core.

Preferably, the inner core has a center hardness (CH) within a range having a lower limit of 20 or 25 or 30 or 35 or 40 or 45 or 50 or 55 Shore D and an upper limit of 60 or 65 or 70 or 75 or 80 or 85 or 90 Shore D. The inner core (center) also preferably has a surface hardness (ICSH) within a range having a lower limit of 20 or 25 or 30 or 35 or 40 or 45 or 50 or 55 Shore D and an upper limit of 60 or 65 or 70 or 75 or 80 or 85 or 90 Shore D. Meanwhile, the outer core layer preferably has a surface hardness (OCLSH) within a range having a lower limit of 20 or 25 or 30 or 35 or 40 or 45 or 50 or 55 Shore D and an upper limit of 60 or 65 or 70 or 75 or 80 or 85 or 90 Shore D. In one embodiment, the surface hardness of the outer core layer is greater than the center hardness of the inner core. In an alternative embodiment, the center hardness of the inner core is greater than the surface hardness of the outer core layer.

Particularly, in one preferred instance, the center hardness of the inner core is in the range of about 25 to about 82 Shore D units and the surface hardness of the outer core is in the range of about 30 to about 87 Shore C units. More particularly, the center hardness of the inner core is about 25 Shore D units or greater and the surface hardness of the outer core is about 40 Shore D units or greater. In these instances, the surface hardness (outer core) is preferably at least 5 Shore D units greater than the center hardness (inner core).

In another instance, the center hardness of the inner core is about 40 Shore D units or greater and the surface hardness of the outer core is about 25 Shore D units or greater. In these instances, the center hardness (inner core) is preferably at least 5 Shore D units greater than the surface hardness (outer core).

In one preferred golf ball, the inner core (center) has a "positive" hardness gradient (that is, the outer surface of the inner core is harder than its geometric center) and the outer core layer has a "positive" hardness gradient (that is, the outer surface of the outer core layer is harder than the inner surface of the outer core layer.) In cases where both the inner core and outer core layer have "positive" hardness gradients, the outer surface hardness of the outer core layer is still preferably greater than the material hardness of the inner core (center).

In another version, the inner core (center) has a positive hardness gradient, while the outer core layer has a "negative" hardness gradient (that is, the outer surface of the outer core layer is softer than the inner surface of the outer core layer.) In yet another version, the outer core layer may have a "zero" hardness gradient. (That is, the hardness values of the outer surface of the outer core layer and the inner surface of the outer core layer are substantially the same.) Particularly, the term, "zero hardness gradient" as used herein, means a surface to center (or second surface) Shore C hardness gradient of less than 8, preferably less than 5 and most preferably less than 3 and may have a value of zero or negative 1 to negative 25. The term, "negative hardness gradient" as used herein, means a surface to center (or second surface) Shore C hardness gradient of less than zero. The terms, "zero hardness gradient" and "negative hardness gradient," may be used herein interchangeably to refer to hardness gradients of negative 1 to negative 25. The term, "positive hardness gradient" as used herein, means a surface to center (or second surface) Shore C hardness gradient of 8 or greater, preferably 10 or greater, and most preferably 20 or greater. By the term, "steep positive hardness gradient" as used herein, it is meant surface to center (or second surface) Shore C hardness gradient of 20 or greater, more preferably 25 or greater, and most preferably 30 or greater. For example, the core may have a steep positive hardness gradient of 35, 40, or 45 Shore C or greater.

Preferably, the hardness gradient from geometric center of the inner core to the surface of the outer core layer is a positive hardness gradient. That is, the outer surface of the outer core layer is harder than the center of the inner core. Methods for measuring the hardness of the core and cover layers and determining the hardness gradients are discussed in further detail below.

As discussed above, the dual-core constitutes an inner core (center) and an outer core layer. The inner core preferably has a diameter within a range having a lower limit of 0.45 or 0.50 or 0.60 or 0.75 or 0.85 or 0.875 inches and an upper limit of 1.125 or 1.15 or 1.39 or 1.55 inches. The outer core layer encloses the inner core such that the two-layered core has an overall diameter within a range having a lower limit of 1.20 or 1.30 or 1.40 or 1.50 or 1.51 or 1.52 or 1.525 inches and an upper limit of 1.54 or 1.55 or 1.555 or 1.56 or 1.59 or 1.62 or 1.64 inches.

The inner core or center preferably has a compression within a range having a lower limit of 10 or less, 20 or less, 30 or less, 40 or less, 50 or less; and an upper limit of 55 or greater, 65 or greater, 75 or greater, 80 or greater, 90 or greater, 100 or greater, 110 or greater, 120 or greater, 130 or greater, or 150 or greater.

Cover Structure

The golf ball cores of this invention may be enclosed with one or more cover layers. A wide variety of materials may be used for forming the outer cover including, for example, polyurethanes; polyureas; copolymers, blends and hybrids of polyurethane and polyurea; ethylene acid copolymer ionomer resins (for example, Surlyn® ionomer resins and HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to help make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

In one preferred embodiment, the ball includes a dual-cover comprising inner and outer cover layers. The inner cover layer is preferably formed from a composition comprising an ionomer or a blend of two or more ionomers that helps impart hardness to the ball. The inner cover layer preferably has a material hardness of 95 Shore C or less, or less than 95 Shore C, or 92 Shore C or less, or 90 Shore C or less, or a material hardness within a range having a lower limit of 60 or 65 or 70 or 75 or 80 or 84 or 85 Shore C and an upper limit of 90 or 92 or 95 Shore C. The thickness of the inner cover layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches.

In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont), which is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is a 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

In one embodiment, the inner cover layer is formed from a composition comprising a 50/45/5 blend of Surlyn® 8940/Surlyn® 9650/Nucrel® 960, and, in a particularly preferred embodiment, has a material hardness of from 80 to 85 Shore C. In another particular embodiment, the inner cover layer is formed from a composition comprising a 50/25/25 blend of Surlyn® 8940/Surlyn® 9650/Surlyn® 9910, preferably having a material hardness of about 90 Shore C. In another version, a blend of 50% Surlyn® 7940 and 50% Surlyn® 8940 is used to form the inner cover. In yet another particular embodiment, the inner cover layer is preferably formed from a composition comprising a 50/50 blend of Surlyn® 8940/Surlyn® 9650, preferably having a material hardness of about 86 Shore C. Surlyn® 8940 is an ethylene/methacrylic acid copolymer in which the MAA acid groups have been partially neutralized with sodium ions. Surlyn® 9650 and Surlyn® 9910 are two different grades of ethylene/methacrylic acid copolymer in which the MAA acid groups have been partially neutralized with zinc ions. Surlyn® 7940 is a copolymer of about 85% ethylene and 15% methacrylic acid that has been neutralized with lithium ions. Nucrel® 960 is an ethylene/methacrylic acid copolymer resin nominally made with 15 wt % methacrylic acid, and available from DuPont.

As discussed above, the dual-core of the golf ball may be enclosed with a single-layered or multi-layered covers. In one embodiment, a single-layered cover having a thickness in the range of about 0.020 to about 0.090 inches, more preferably about 0.030 to about 0.070 inches, is formed. The cover has a hardness of about Shore D 80 or less, more preferably 70 or less, and most preferably about 60 or less. In another embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed, that is, the outer cover layer is harder than the inner cover layer.

Golf Ball Constructions

As discussed above, the thermoplastic ionomer compositions of this invention may be used to form a core for any suitable ball construction, including, for example, three-piece, four-piece, and five-piece designs.

The core and cover compositions may be prepared using conventional mixing techniques. The core composition can be formed into an inner core structure by ordinary techniques such as, for example, injection or compression molding. After molding, the core structure is removed from the mold and its surface may be treated using techniques such as corona discharge, sand blasting, or grinding to improve adhesion of the surrounding layers. Injection molding or compression molding can be used to form an outer core layer and inner cover layer about the inner core to produce an intermediate golf ball. The cover layer(s) is subsequently molded over the inner/outer core to produce a final golf ball.

In compression molding, the outer core and/or inner cover composition is formed into smooth surfaced hemispherical shells which are then positioned around the inner core in a mold having the desired inner cover thickness and subjected to compression molding under heat followed by cooling. This process fuses the shells together to form a unitary intermediate ball. Alternatively, the intermediate balls may be produced by injection molding, wherein the outer core and/or inner cover layer is injected directly around the core placed at the center of an intermediate ball mold under heat and pressure. After molding, the golf balls produced may undergo various further processing steps such as buffing, painting and marking using conventional techniques.

Figure 2:
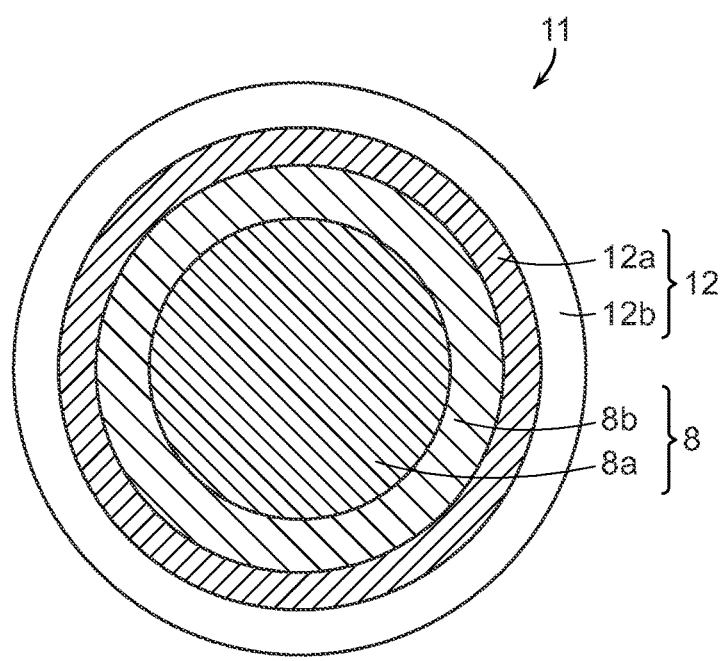
FIG. 2 is a cross-sectional view of a four-piece golf ball having a dual-core comprising an inner core/outer core; and inner cover layer; and an outer cover layer made in accordance with the present invention.
Figure 3:
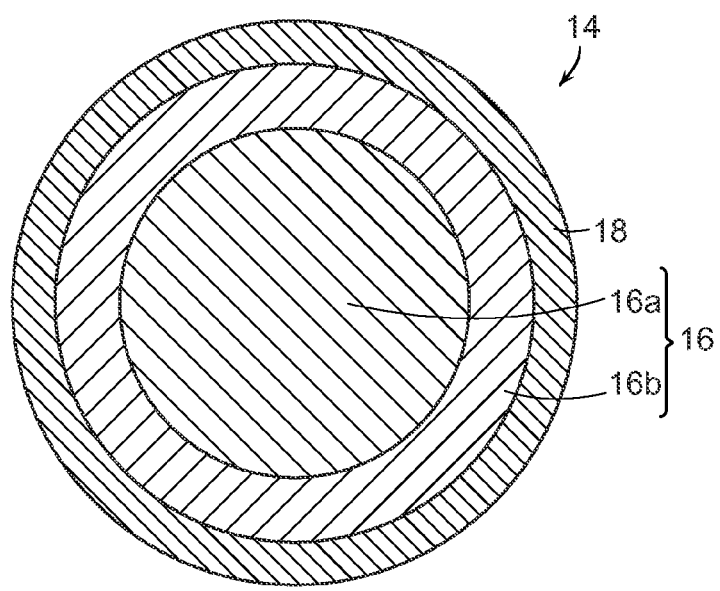
FIG. 3 is a cross-sectional view of another three-piece golf ball having a dual-core made in accordance with the present invention.
Figure 4:
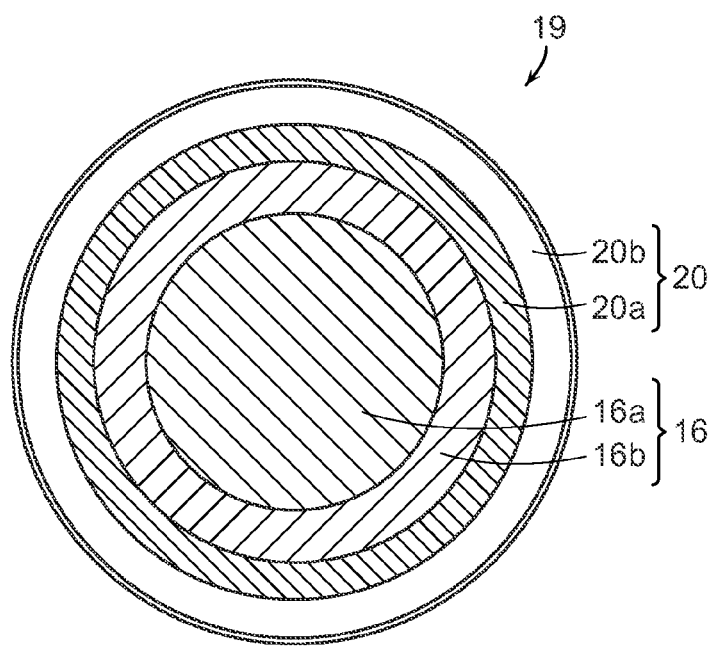
FIG. 4 is a cross-sectional view of another four-piece golf ball having a dual-core made in accordance with the present invention.

Referring to FIG. 1, one version of a golf ball that can be made in accordance with this invention is generally indicated at (6). The ball (6) contains a dual-core (8) having an inner core (center) (8*a*) and outer core layer (8*b*) surrounded by a single-layered cover (10). The center (8*a*) is formed from a first ionomer composition containing acid groups neutralized to 70% or less. The outer core layer (8*b*) is formed from a second ionomer composition containing acid groups neutralized to greater than 70%. In FIG. 2, a golf ball (11) containing the above-described dual-core (8) is surrounded by a dual-cover (12) having an inner cover layer (12*a*) and outer cover layer (12*b*), which may be formed from any of the cover materials described above. Referring to FIG. 3, in another version, the golf ball (14) contains a dual-core (16) having an inner core (center) (16*a*) and outer core layer (16*b*) surrounded by a single-layered cover (18). The center (16*a*) is formed from a first ionomer composition containing acid groups neutralized to greater than 70%. The outer core layer (16*b*) is formed from a second ionomer composition containing acid groups neutralized to 70% or less. In FIG. 4, a golf ball (19) containing the above-described dual-core (16) is surrounded by a dual-cover (20) having an inner cover layer (20*a*) and outer cover layer (20*b*).

The surfaces of the golf balls shown in FIGS. 1-4 may have various dimple patterns to modify the aerodynamic properties of the ball. It should be understood the golf balls shown in FIGS. 1-4 are for illustrative purposes only and not meant to be restrictive. Other golf ball constructions can be made in accordance with this invention.

For example, a golf ball containing an inner core (center); an intermediate core layer; and an outer core layer may be made. The center preferably has a diameter within a range having a lower limit of 0.100 or 0.125 or 0.250 inches and an upper limit of 0.375 or 0.500 or 0.750 or 1.00 inches. The intermediate core layer preferably has a thickness within a range having a lower limit of 0.050 or 0.100 or 0.150 or 0.200 inches and an upper limit of 0.300 or 0.350 or 0.400 or 0.500 inches. The outer core layer encloses the center and intermediate core layer structure such that the multi-layer core has an overall diameter within a range having a lower limit of 1.40 or 1.45 or 1.50 or 1.55 inches and an upper limit of 1.58 or 1.60 or 1.62 or 1.66 inches.

In one embodiment, the center is made of a rubber material such as, for example, polybutadiene, polyisoprene, ethylene propylene rubber (EPR), ethylene propylene diene rubber (EPDM), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, and polystyrene elastomers; b) the intermediate core layer is made of a first ionomer composition containing acid groups neutralized to 70% or less; and c) the outer core layer is made of a second ionomer composition containing acid groups neutralized to greater than 70%.

In one embodiment, the center has an outer surface hardness of 70 Shore C or greater, more preferably a surface hardness of 80 Shore C or greater, and most preferably a surface hardness of 85 Shore C or greater. For example, the center may have an outer surface hardness within a range having a lower limit of 70 or 75 or 80 Shore C and an upper limit of 90 or 95 Shore C. The outer core layer may have an outer surface hardness that is less than that of the center and is preferably 50 Shore C or less; or 60 Shore C or less; or 70 Shore C or less; or 75 Shore C or less; or 80 Shore C or less. The intermediate layer preferably has an outer surface greater than that of the center and outer core layer. Preferably, the intermediate layer has a surface hardness of 80 Shore C or greater.

In another embodiment, the center is made of a rubber material as described above; b) the intermediate core layer is made of a first ionomer composition containing acid groups neutralized to greater than 70%; and c) the outer core layer is made of a second ionomer composition containing acid groups neutralized to 70% or less.

It is recognized that additional golf ball constructions can be made without departing from the spirit and scope of the present invention. For example, in one version, the inner core is made of a first ionomer composition containing acid groups neutralized to 70% or less; b) the intermediate core layer is made of a second ionomer composition containing acid groups neutralized to greater than 70%; and c) the outer core layer is made of a rubber material as described above. In yet another version, the inner core is made of a first ionomer composition containing acid groups neutralized to greater than 70%; b) the intermediate core layer is made of a second ionomer composition containing acid groups neutralized to 70% or less; and c) the outer core layer is made of a rubber material as described above.

Test Methods

Hardness. The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton. Compression may be measured as described in McNamara et al., U.S. Pat. No. 7,777,871, the disclosure of which is hereby incorporated by reference.

Coefficient of Restitution ("COR"). The COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period (COR=$V_{out}/V_{in}=T_{in}/T_{out}$).

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted.

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A golf ball, comprising:
a) an inner core layer formed from a first thermoplastic ionomer composition comprising an ethylene acid copolymer and containing acid groups such that 70% or less of the acid groups are neutralized;
b) an outer core layer formed from a second ionomer composition comprising an ethylene acid copolymer and containing acid groups such that greater than 70% of the acid groups are neutralized, wherein the center of the inner core and surface of the outer core layer each has a hardness, and the center hardness of the inner core is greater than the surface hardness of the outer core layer, wherein the center of the inner core has a hardness in the range of 25 to 65 Shore D and the surface of the inner core has a surface hardness in the range of 30 to 70 Shore D to provide a positive hardness gradient in the inner core, and the outer core layer has a surface hardness in the range of 20 to 60 Shore D to provide a negative hardness gradient in the outer core, and wherein the first ionomer composition has a flex modulus of 20,000 psi to 150,000 psi and the second ionomer composition has a flex modulus of 1,000 to 50,000 psi, the flex modulus of the first ionomer composition being greater than the flex modulus of the second ionomer composition; and
c) a cover having at least one layer.

2. The golf ball of claim 1, wherein 90% or greater of the acid groups of the second ionomer composition are neutralized.

3. The golf ball of claim 1, wherein the acid groups of the first and second ionomer compositions are neutralized by a metal cation salt.

4. The golf ball of claim 3, wherein the metal cation is selected from the group consisting of Zn, Na, Li, K, Ca, Mg, Ni, Mn, Cu, Ti, and Al, and mixtures thereof.

5. The golf ball of claim 1, wherein the first ionomer composition does not comprise a fatty acid or salt thereof and the second ionomer composition comprises a fatty acid or salt thereof.

6. The golf ball of claim 5, wherein the fatty acid is selected from the group consisting of stearic acid, behenic acid, erucic acid, oleic acid, linoleic acid, and dimerized derivatives, and mixtures thereof.

7. The golf ball of claim 1, wherein the first and second ionomer compositions each comprise an E/X/Y copolymer, wherein E is ethylene; X is a $C_3$ to $C_8$ α,β-ethylenically unsaturated mono- or dicarboxylic acid; and Y is a softening monomer.

8. The golf ball of claim 7, wherein the copolymer is selected from the group consisting of ethylene/(meth)acrylic acid/n-butyl acrylate; ethylene/(meth)acrylic acid/ethyl acrylate; ethylene/(meth)acrylic acid/methyl acrylate; ethylene/(meth)acrylic acid/n-butyl acrylate; and ethylene/(meth)acrylic acid/isobutyl acrylate copolymers.

9. The golf ball of claim 1, wherein the modulus of the first ionomer composition is at least 10% greater than the modulus of the second ionomer composition.

10. The golf ball of claim 1, wherein the modulus of the first ionomer composition is 40,000 psi or greater.

11. The golf ball of claim 1, wherein the cover is a single layer having a thickness of about 0.015 to about 0.090 inches and is formed from a thermoplastic or thermoset material.

12. The golf ball of claim 1, wherein the cover comprises two or more layers and has an overall thickness of about 0.020 to about 0.110 inches and wherein each cover layer is formed from a thermoplastic or thermoset material.

13. The golf ball of claim 1, wherein the cover comprises an inner cover layer and outer cover layer, the outer cover having a Shore D hardness of less than 65, the hardness of the outer cover being less than the hardness of the inner cover.

14. The golf ball of claim 1, wherein the cover is formed from a composition comprising a polymer selected from the group consisting of ethylene acid copolymer ionomers; polyesters; polyamides; polyamide-ethers, polyamide-esters; polyurethanes, polyureas; fluoropolymers; polystyrenes; polypropylenes and polyethylenes; polyvinyl chlorides; polyvinyl acetates; polycarbonates; polyvinyl alcohols; polyethers; polyimides, polyetherketones, polyamideimides; and mixtures thereof.

* * * * *